US010019834B2

(12) United States Patent
Fay et al.

(10) Patent No.: US 10,019,834 B2
(45) Date of Patent: Jul. 10, 2018

(54) REAL-TIME RENDERING OF VOLUMETRIC MODELS WITH OCCLUSIVE AND EMISSIVE PARTICLES

(71) Applicant: MICROSOFT TECHNOLOGY LICENSING, LLC, Redmond, WA (US)

(72) Inventors: Jonathan Fay, Redmond, WA (US); Mark Finch, Redmond, WA (US); Stephen Coy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 14/497,748

(22) Filed: Sep. 26, 2014

(65) Prior Publication Data
US 2016/0093092 A1   Mar. 31, 2016

(51) Int. Cl.
*G06T 15/00* (2011.01)
*G06T 15/08* (2011.01)
*G06T 17/00* (2006.01)
*G06F 17/30* (2006.01)
*G06T 19/00* (2011.01)

(52) U.S. Cl.
CPC .......... *G06T 15/08* (2013.01); *G06F 17/3028* (2013.01); *G06F 17/30312* (2013.01); *G06T 17/00* (2013.01); *G06T 19/003* (2013.01); *G06T 2210/56* (2013.01)

(58) Field of Classification Search
None
See application file for complete search history.

(56) References Cited

U.S. PATENT DOCUMENTS

| | | |
|---|---|---|
| 6,326,964 B1 | 12/2001 | Snyder et al. |
| 6,448,966 B1 | 9/2002 | Yet |
| 6,525,732 B1 | 2/2003 | Gadh et al. |
| 6,717,576 B1 | 4/2004 | Duluk et al. |
| 6,744,435 B2 | 6/2004 | Zwicker et al. |
| 7,973,791 B2 | 7/2011 | Mihara |

(Continued)

FOREIGN PATENT DOCUMENTS

WO    2006126205 A2    11/2006

OTHER PUBLICATIONS

Harris, "Real-Time Cloud Rendering for Games," Mar. 2002, Game Developers Conference, pp. 1-14.*

(Continued)

*Primary Examiner* — Andrew G Yang
(74) *Attorney, Agent, or Firm* — Schwegman Lundberg & Woessner, P.A.

(57) ABSTRACT

Methods, devices, and computer-readable media that allow real-time rendering while navigating virtually about or through a digital 3-D volumetric model. Examples provide techniques to facilitate real-time rendering while navigating through and around the 3-D volumetric model that can have many thousands of particles, where the particles can have emissive, occlusive, and translucent properties. Such complex particles of the 3-D volumetric model are presorted along predefined viewing directions in order to enable real-time rendering from when a navigation control has been entered. Presorting of data may be performed at a processing device(s) located across a public or private network from a user's device on which the real-time rendering is performed.

18 Claims, 9 Drawing Sheets

(56) References Cited

U.S. PATENT DOCUMENTS

| | | | |
|---|---|---|---|
| 8,320,659 B2 | 11/2012 | Song et al. | |
| 8,970,592 B1* | 3/2015 | Petterson | G06T 13/60 345/419 |
| 2006/0106591 A1* | 5/2006 | Bordes | G06F 15/7864 703/22 |
| 2008/0170079 A1* | 7/2008 | Ramshaw | G06T 15/005 345/501 |
| 2012/0249557 A1* | 10/2012 | Ferguson | G06T 13/00 345/473 |
| 2013/0021445 A1 | 1/2013 | Cossette-Pacheco et al. | |
| 2013/0124148 A1 | 5/2013 | Jin et al. | |
| 2014/0354672 A1* | 12/2014 | Engel | G06T 15/04 345/589 |

OTHER PUBLICATIONS

Chen, et al., "Depth-Presorted Triangle Lists", In Journal of Transactions on Graphics, vol. 31 Issue 6, Nov. 2012, 10 pages.

Udsholt, Jakob, "Real-time rendering of procedurally generated volumetric models" Retrieved on: Jul. 1, 2014, https://www.google.co.in/url?sa=t&rct=j&q=&esrc=s&source=web&cd=1&ved=0CB0QFjAA&url=http%3A%2F%2Fwww2.imm.dtu.dk%2Fpubdb%2Fviews%2Fedoc_download.php%2F6658%2Fpdf%2Fim.

Weiskopf, et al., "Real-Time Advection and Volumetric Illumination for the Visualization of 3D Unsteady Flow", In IEEE VGTC Symposium on Visualization, Jun. 1, 2005, 8 pages.

Voglreiter, Philip, "Stochastic Particle-Based Volume Rendering", In Proceedings of 16th Central European Seminar on Computer Graphics, Apr. 29, 2012, 8 pages.

\* cited by examiner

REAL-TIME RENDERING OF VOLUMETRIC MODELS WITH OCCLUSIVE AND EMISSIVE PARTICLES

BACKGROUND

Traditional methods of ensuring correctness when rendering large three-dimensional volumetric models require the sorting of particles in order to draw an image (e.g., painter's algorithm). This type of sorting is view dependent and generally has been either too expensive to allow for real-time rendering, or has required continuous re-sorting as the view changed, with various incremental approaches to sorting particles, including graphics processing unit (GPU) sorting, clustering, and so on. This continuous resorting of large scale 3-D volumetric models is also computationally expensive.

Thus, large 3-D volumetric model navigation, such as navigation in and around medical or interstellar 3-D volumetric models, is not possible in real time on a personal computer or comparable device that includes typical off-the-shelf graphics processors. Current applications that allow navigation of large 3-D volumetric models having emissive and occlusive particles provide only previously recorded guided tours. For example, users must choose from a growing number of guided tours created by astronomers and educators from famous observatories and planetariums.

SUMMARY

The techniques discussed herein facilitate real-time navigation of a 3-D volumetric model having emissive, occlusive, and/or translucent particles. Real-time rendering of images from a desired viewpoint of a 3-D volumetric model is attainable, provided sortings are generated of all the particles of the 3-D volumetric model for a small predefined number of viewing directions. Presorting allows for a user to define rendering of images as they navigate in and around a 3-D volumetric model. The user is not limited to prerecorded guided tours, but can navigate as they desire.

The techniques discussed herein may allow a commodity graphics processor, such as that used on a personal computer, the ability to render, in real time, images from a complex 3-D volumetric model that includes complex particles, such as ones that emit light, occlude light, and/or alter light.

This Summary is provided to introduce a selection of concepts in a simplified form that are further described below in the Detailed Description. This Summary is intended to be used as an aid in determining the scope of the claimed subject matter. The term "techniques," for instance, may refer to system(s), method(s), computer-readable media/instructions, module(s), algorithms, hardware logic (e.g., field-programmable gate Arrays (FPGAs), application-specific integrated circuits (ASICs), application-specific standard products (ASSPs), system-on-a-chip systems (SOCs), complex programmable logic devices (CPLDs)), and/or technique(s) as permitted by the context described above and throughout the document.

BRIEF DESCRIPTION OF THE DRAWINGS

The detailed description is described with reference to the accompanying figures. In the figures, the leftmost digit of a reference number identifies the figure in which the reference number first appears. The same reference numbers in different figures indicate similar or identical items.

DETAILED DESCRIPTION

Overview

This disclosure is directed to techniques to allow real-time rendering while navigating virtually about or through a digital 3-D volumetric model.

Examples described herein provide techniques and example systems to facilitate real-time rendering while navigating through and around a 3-D volumetric model that can have many thousands of particles, where the particles can have emissive, occlusive, and/or translucent properties. Sprites are examples of a type of particle. Other particle types may be used.

In contrast to previous approaches, this technique does not just provide previously generated renderings of navigation through a complex 3-D volumetric model. Rather, the complex particles of the 3-D volumetric model are presorted along predefined viewing directions in order to enable real-time rendering from when a navigation control has been entered. In some examples, instead of presorting at a user's computer device, the presorting of data may be performed at a processing device(s) located across a public or private network from the user's device.

As such, the techniques and systems described herein may be implemented in a number of ways. Examples are provided below with reference to the following figures. The examples and illustrations described herein may be combined.

Illustrative Environment

Figure 1:
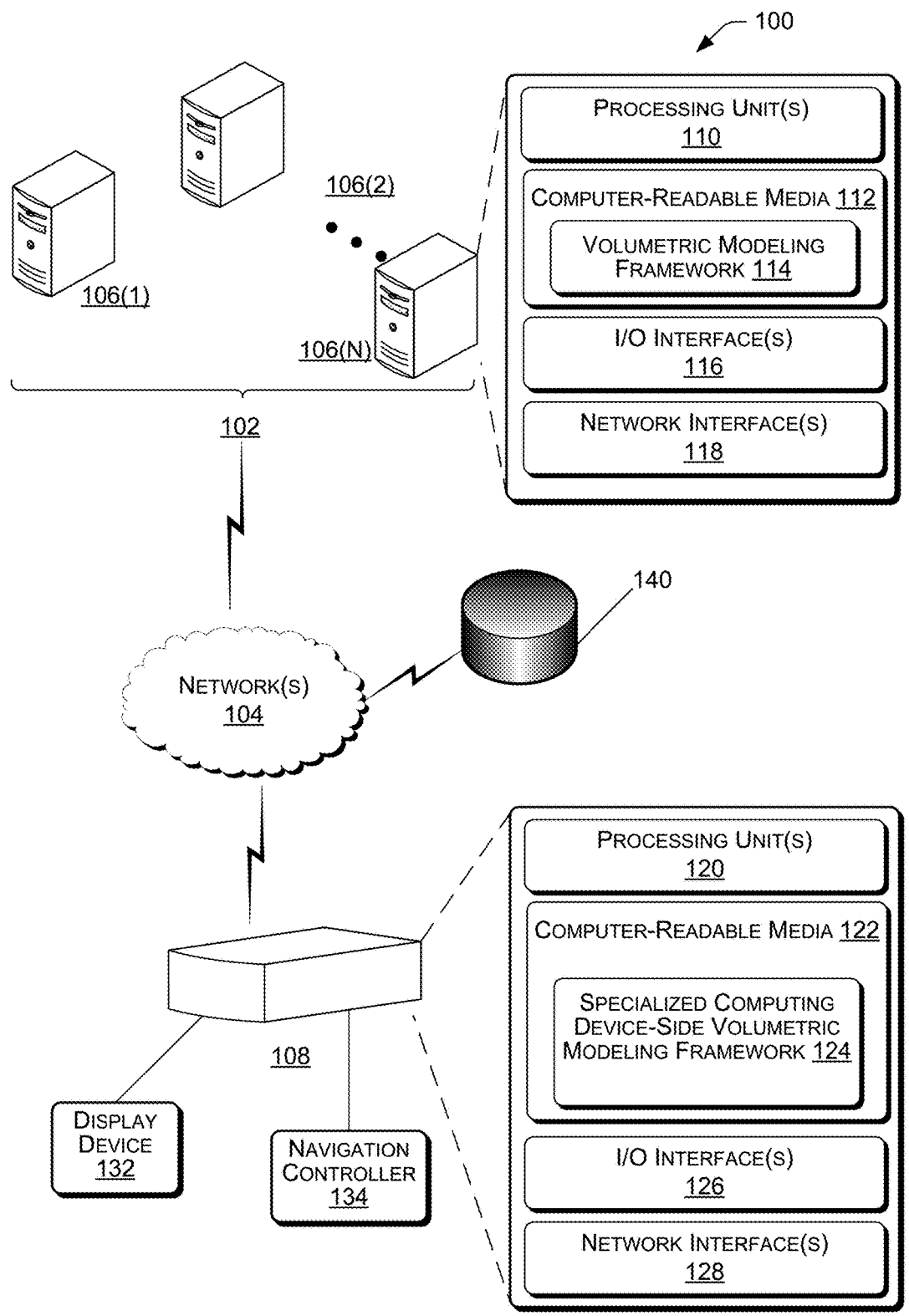
FIG. 1 is a block diagram depicting an example environment in which examples of real-time rendering of volumetric models may operate.

FIG. 1 is a block diagram depicting an example environment 100 in which examples described herein may operate. In some examples, the various devices and/or components of environment 100 include distributed computing resources 102 that may communicate with one another and with external devices via one or more networks 104.

For example, network(s) 104 may include public networks, such as the Internet, private networks such as an institutional and/or personal intranet, or some combination of private and public networks. Network(s) 104 may also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth), or any combination thereof. Network(s) 104 may utilize communications protocols, including packet-based and/or datagram-based protocols, such as internet protocol (IP), transmission control protocol (TCP), user datagram protocol (UDP), or other types of protocols. Moreover, network(s) 104 may also include a number of devices that facilitate network communications and/or form a hardware basis for the networks, such as switches, routers, gateways, access points, firewalls, base stations, repeaters, backbone devices, and the like.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In various examples, distributed computing resource(s) 102 include computing devices such as devices 106(1) through 106(N). Examples support scenarios in which device(s) 106 may include one or more computing devices that operate in a cluster or other grouped configuration to share resources, balance load, increase performance, provide fail-over support or redundancy, or for other purposes. Although illustrated as desktop computers, device(s) 106 may include a diverse variety of device types and are not limited to any particular type of device. Device(s) 106 may include specialized computing device(s) 108.

For example, device(s) 106 may include any type of computing device having one or more processing unit(s) 110 operably connected to computer-readable media 112, input/output (I/O) interfaces(s) 116, and network interface(s) 118. Computer-readable media 112 may have at least a portion of the volumetric modeling framework 114 stored thereon. Also, for example, specialized computing device(s) 108 may include any type of computing device having one or more processing unit(s) 120 operably connected to computer-readable media 122, I/O interface(s) 126, and network interface(s) 128. Computer-readable media 122 may have a specialized computing device-side volumetric modeling framework 124 stored thereon. The device 108 may include a display device 132 and/or a navigation control device 134. The devices 132 and 134 may be in communication with the volumetric modeling framework 124, via the I/O interface(s) 126.

The environment 100 may also include a memory device 130 in communication with network(s) 104. The memory device 130 may store presorted 3-D volumetric model data and/or a portion of volumetric modeling framework. Memory device 130 is accessible by computing device(s) 106 or 108 via a network address or similar construct.

Figure 2:
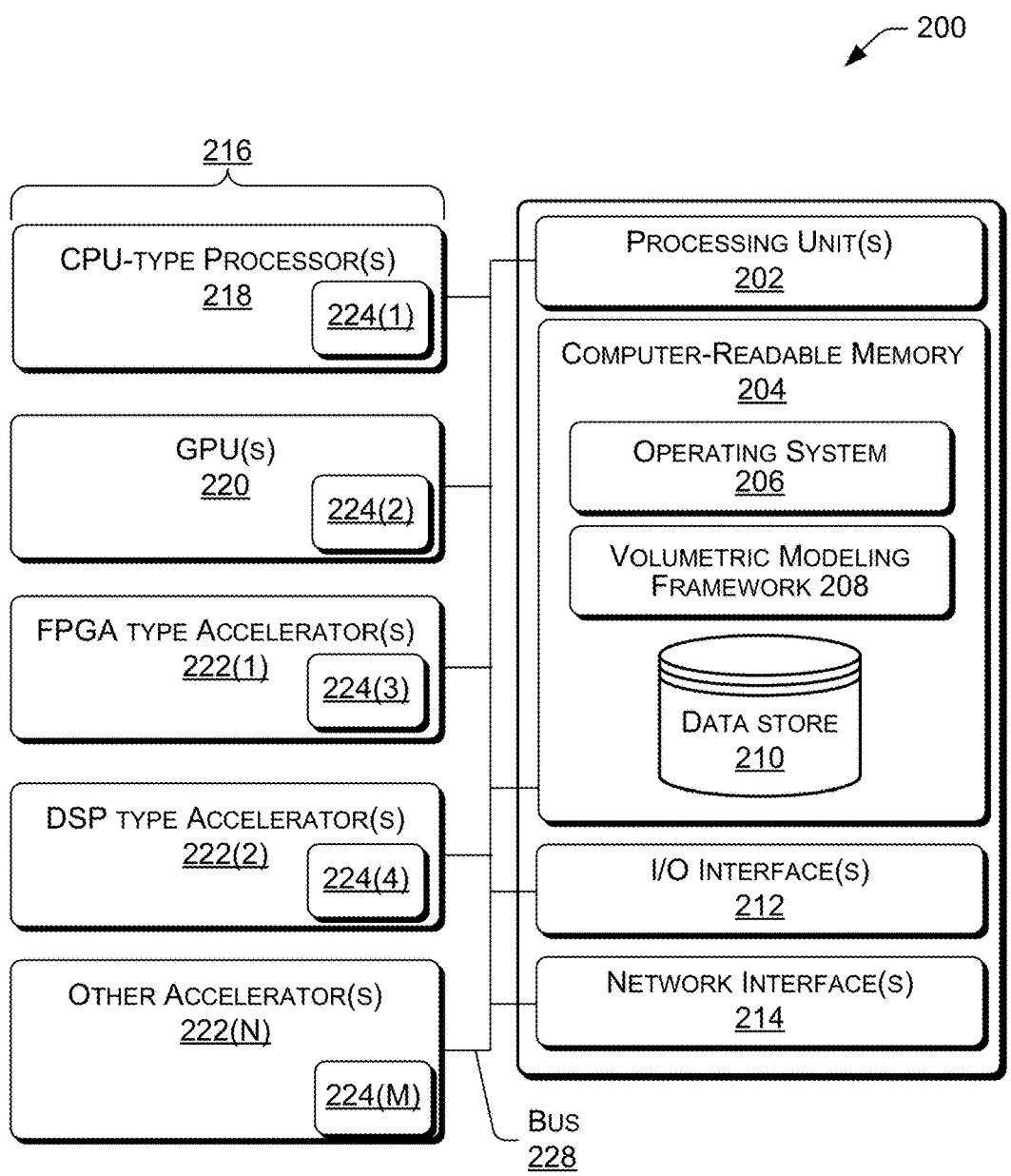
FIG. 2 is a block diagram depicting an example device that may perform real-time navigation relative to a complex 3-D volumetric model, according to various example operations.

FIG. 2 depicts an illustrative device 200, which may represent device(s) 106 or 108. Illustrative device 200 may include any type of computing device having one or more processing unit(s) 202, such as processing unit(s) 110 or 120, operably connected to computer-readable media 204, such as computer-readable media 112 or 122. The connection may be via a bus 228, which in some instances may include one or more of a system bus, a data bus, an address bus, a PCI bus, a Mini-PCI bus, and any variety of local, peripheral, and/or independent buses, or via another operable connection. Processing unit(s) 202 may represent, for example, a CPU incorporated in device 200. The processing unit(s) 202 may similarly be operably connected to computer-readable media 204.

The computer-readable media 204 may include, at least, two types of computer-readable media, namely, computer storage media and communication media. Computer storage media may include volatile and nonvolatile, machine-readable, removable, and nonremovable media implemented in any method or technology for storage of information (in compressed or uncompressed form), such as computer (or other electronic device) readable instructions, data structures, program modules, or other data to perform processes or methods described herein. The computer-readable media 112 and the computer-readable media 122 are examples of computer storage media. Computer storage media include, but are not limited to hard drives, floppy diskettes, optical disks, CD-ROMs, DVDs, read-only memories (ROMs), random-access memories (RAMs), EPROMs, EEPROMs, flash memory, magnetic or optical cards, solid-state memory devices, or other types of media/machine-readable medium suitable for storing electronic instructions.

In contrast, communication media may embody computer-readable instructions, data structures, program modules, or other data in a modulated data signal, such as a carrier wave, or other transmission mechanism. As defined herein, computer storage media do not include communication media.

Device 200 may include, but is not limited to, desktop computers, server computers, web-server computers, personal computers, mobile computers, laptop computers, tablet computers, wearable computers, implanted computing devices, telecommunication devices, automotive computers, network-enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device, such as one or more separate processor device(s) 216, such as CPU-type processors (e.g., microprocessors) 218, graphics processing units (GPUs) 220, or accelerator device(s) 222.

In some examples, as shown regarding device 200, computer-readable media 204 may store instructions executable by the processing unit(s) 202, which may represent a CPU incorporated in device 200. Computer-readable media 204 may also store instructions executable by an external CPU-type processor 218, executable by a GPU 220, and/or executable by an accelerator 222, such as an FPGA-type accelerator 222(1), a DSP-type accelerator 222(2), or any internal or external accelerator 222(N).

Executable instructions stored on computer-readable media 202 may include, for example, an operating system 206, a volumetric modeling framework 208, and other modules, programs, or applications that may be loadable and executable by processing units(s) 202, and/or 216. Alternatively, or in addition, the functions described herein may be performed, at least in part, by one or more hardware logic components, such as accelerators 222. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. For example, accelerator 222(N) may represent a hybrid device, such as one from ZYLEX® or ALTERA® that includes a CPU core embedded in an FPGA fabric.

In the illustrated example, computer-readable media 204 also include a data store 210. In some examples, data store 210 includes data storage such as a database, data warehouse, or other type of structured or unstructured data storage. In some examples, data store 210 includes a relational database with one or more tables, indices, stored procedures, and so forth to enable data access. Data store 210 may store data for the operations of processes, applications, components, and/or modules stored in computer-readable media 204 and/or executed by processor(s) 202 and/or 218, and/or accelerator(s) 222. For example, data store 210 may store 3-D volumetric model(s) and/or presorted 3-D volumetric model data for access by the volumetric modeling framework 208. Alternately, some or all of the above-referenced data may be stored on separate memories 224 such as a memory 224(1) onboard a CPU-type processor 218 (e.g., microprocessor(s)), memory 224(2) onboard a GPU 220, memory 224(3) onboard an FPGA-type accelerator 222(1), memory 224(4) onboard a DSP-type accelerator 222(2), and/or memory 224(M) onboard another accelerator 222(N) and/or remotely located memory device 130.

Device 200 may further include one or more input/output (I/O) interface(s) 212, such as I/O interface(s) 116 or 126, to allow device 200 to communicate with input/output devices such as user input devices including peripheral or on-screen input devices (e.g., a navigation control device 134, a keyboard, a mouse, a pen, a game controller, a voice input device, a touch input device, a gestural input device, and the like) and/or output devices including peripheral output devices (e.g., display device 132, a printer, audio speakers, a haptic output, and the like). Device 200 may also include one or more network interface(s) 214, such as network interface(s) 118 or 128, to enable communications between computing device 200 and other networked devices, such as another device 200, memory device 130, or devices 106 or 108 over network(s) 104. Such network interface(s) 214 may include one or more network interface controllers (NICs) or other types of transceiver devices to send and receive communications over a network.

Illustrative Volumetric Modeling Framework

Figure 3:
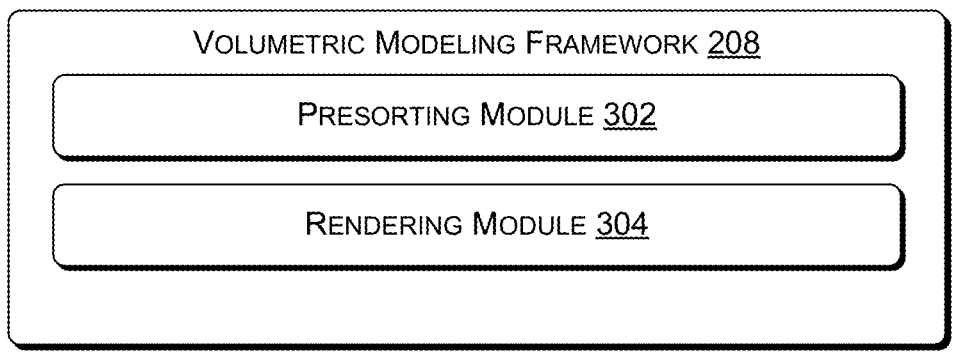
FIG. 3 is a block diagram depicting an example volumetric modeling framework to perform real-time navigation relative to a complex 3-D volumetric model, according to some examples.

FIG. 3 is a block diagram of module of volumetric modeling framework 208. Volumetric modeling framework 208 may include presorting module 302 and/or rendering module 304. Presorting module 302 may be located remotely from where rendering module 304 is located.

Presorting module 302 causes the host or designated computer system, such as device(s) 106 or 108, to presort the particles of a 3-D volumetric model based on individuals of a plurality of previously designated viewing directions. The number of the viewing directions may be user defined, based on the creator of the 3-D volumetric model or based on a default number. In order to provide smooth navigation of rendering effects, four or more viewing directions are preferable. Other numbers of viewing directions may be used. The distribution of the viewing directions relative to the 3-D volumetric model may be uniform and/or random. As long as the viewing directions provide views of all sides of the 3-D, model sorting and real-time rendering will produce a seamless or near-seamless navigation video output.

Illustrative Specialized Computing Device

Figure 4:
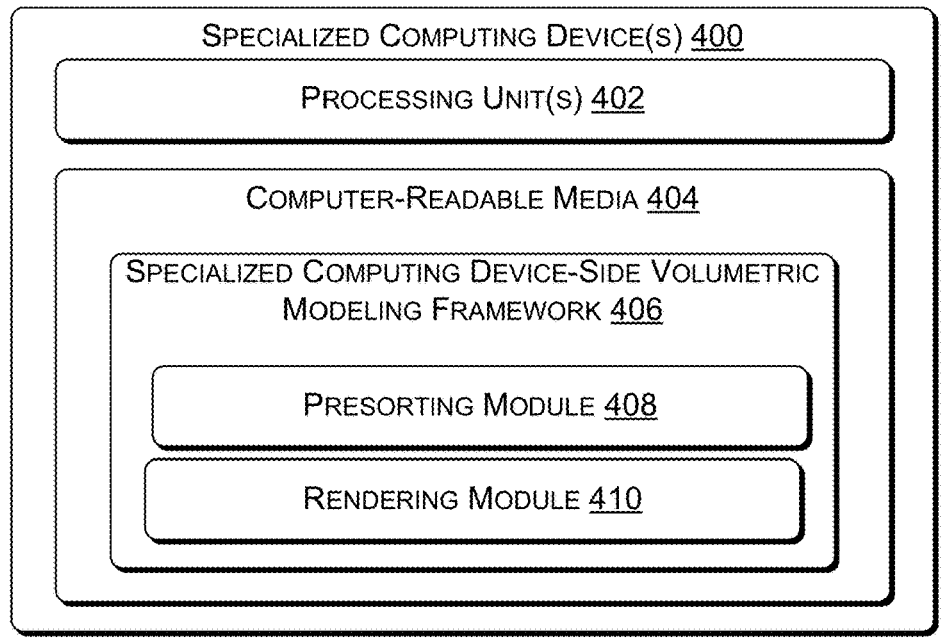
FIG. 4 is a block diagram depicting an example specialized computing device that may perform real-time navigation relative to a complex 3-D volumetric model, according to some examples.

FIG. 4 is a block diagram of illustrative, specialized computing device(s) 400, such as specialized computing device(s) 108, having illustrative modules to render images relating to the stored 3-D volumetric model in real time after the particles of the 3-D volumetric model have been pre-sorted. Specialized computing device(s) 400 include a processing unit(s) 402 and computer-readable media 404. Computer-readable media 404 may include a volumetric modeling framework 406. Volumetric modeling framework 406 may include a presorting module 408 and a rendering module 410.

Illustrative Operations

Figure 5:
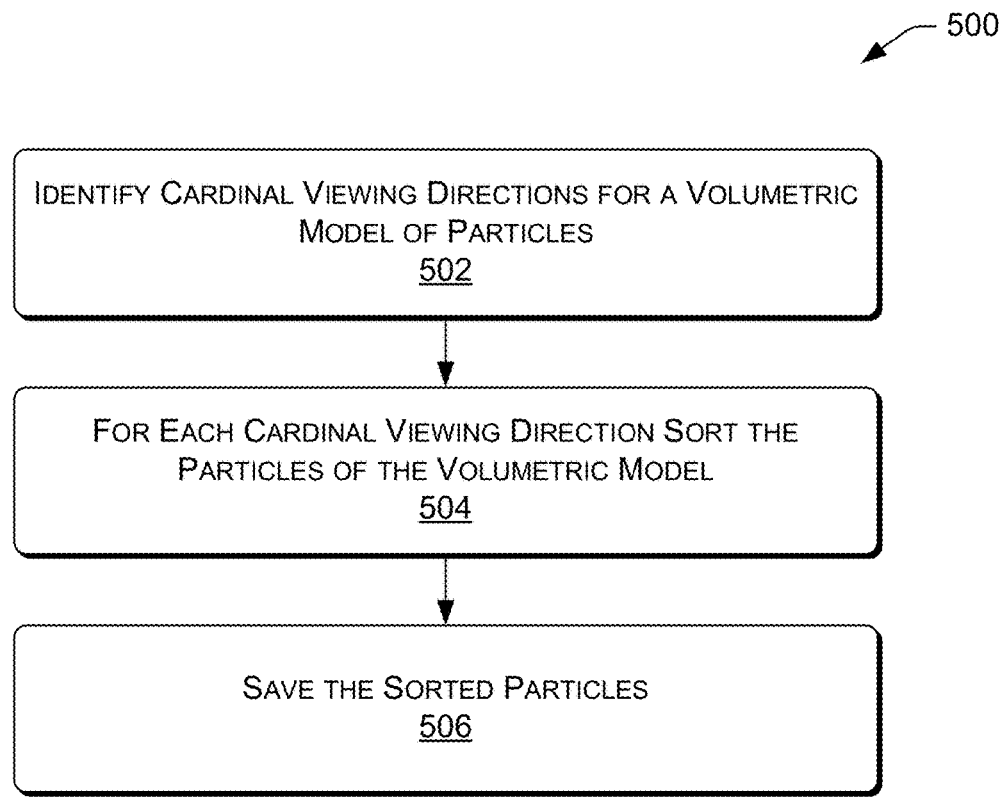
FIG. 5 is a flow diagram illustrating an example process to presort particles of a complex 3-D volumetric model.
Figure 6:
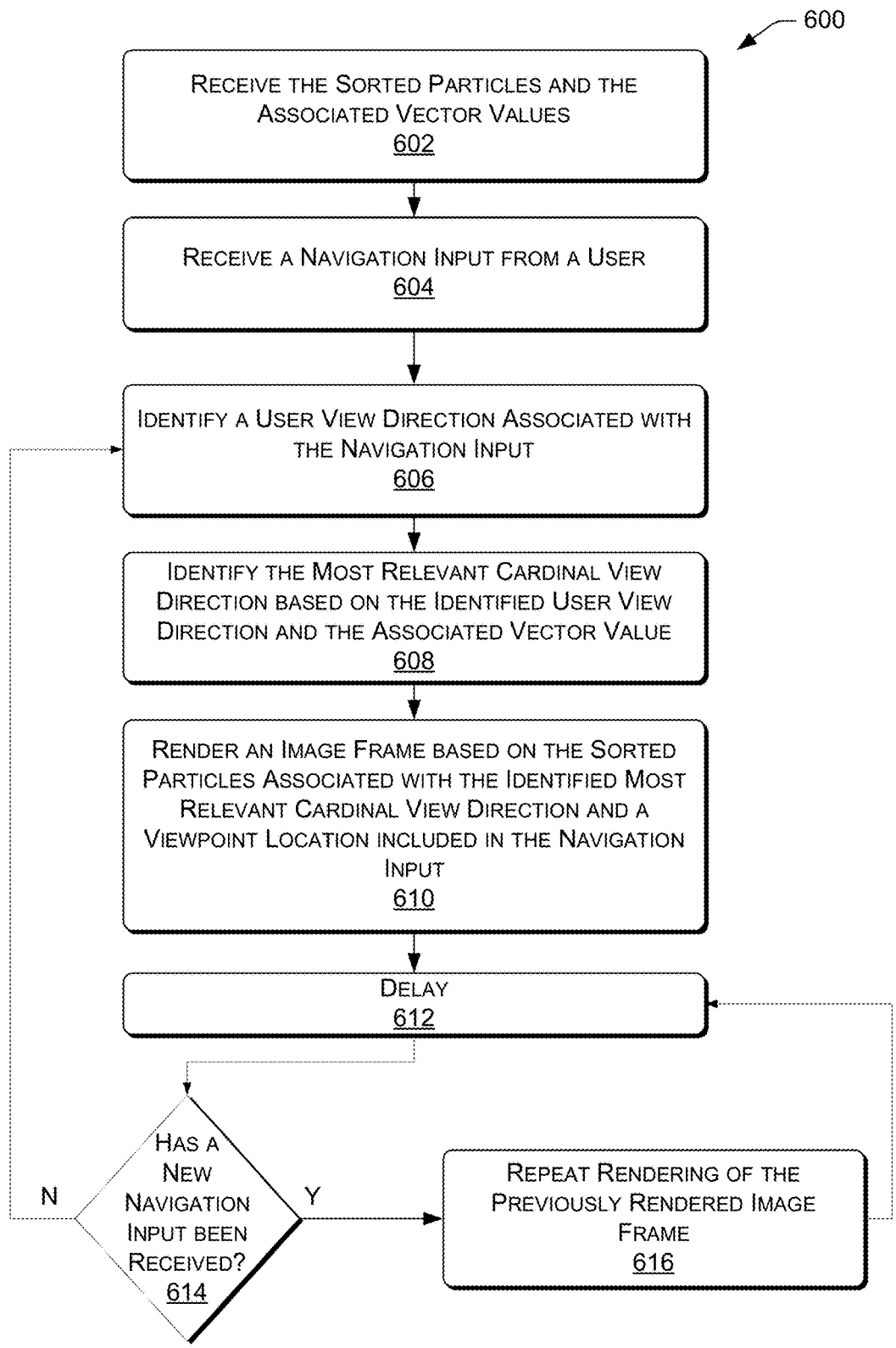
FIG. 6 is a flow diagram illustrating an example process of performing real-time navigation within a 3-D volumetric model using presorted particles.

FIGS. 5 and 6 are diagrams of illustrative processes of performing presorting 500 and real-time rendering 600, respectively.

The processes 500 and 600 are illustrated as a collection of blocks in logical flow graphs, which represent a sequence of operations that may be implemented in hardware, software, or a combination thereof. In the context of software, the blocks represent computer-executable instructions stored on one or more computer-readable storage media that, when executed by one or more processors, perform the recited operations. Computer-executable instructions may include routines, programs, objects, components, data structures, and the like that perform particular functions or implement particular abstract data types. The order in which the operations are described is not intended to be construed as a limitation, and any number of the described blocks may be combined in any order and/or in parallel to implement the illustrated process. One or more of the processes described herein may occur independently or in relation in any order, whether in series or parallel.

FIG. 5 is a flow diagram of an illustrative process 500 to perform presorting of 3-D volumetric models. The process 500 is described with reference to the illustrative environment 100, and may be performed by device 200 or 400, any other device or combination thereof. Of course, the process 500 (and other processes described herein) may be performed in other environments and/or by other devices. These various environments and device examples are described as "a computing resource," which may include "a computing device." The time to conduct the presorting and rendering may vary as a function of a computing resource chosen to conduct the presorting and rendering, an amount of the process conducted, and number of particles in the 3-D volumetric model, among other factors.

With regard to the presorting process 500, a 3-D volumetric model is received at a sorting computing device associated with a user designated for controlling sorting of particles included in the 3-D volumetric model, see block 502. The sorting computing device may be any of distributed computing resources 102 or specialized computing device(s) 108 shown in the environment 100, or a comparable computing device. The 3-D volumetric model may be stored within memory local to the sorting computing device or may be remotely stored, such as at memory device 130.

At a block 504, cardinal viewing directions are identified relative to the 3-D volumetric model. Identification of cardinal viewing directions may be performed by at least one user interacting with at least one of the computing resource devices 106(1) through 106(N). The user may interact with the I/O interface(s) 116 using at least one user interface device (e.g., cursor control device, command entry device, voice activation device, etc.). For example, the cursor control device may allow a user to graphically create an indication of direction. The cursor control device may include hardware and/or software components that allow the user to create cardinal viewing direction indications in 3-D space (e.g., window, browser, etc.) associated with the received 3-D volumetric model of particles. The creation of the cardinal viewing direction indication may be performed at least using a graphical user interface in conjunction with a rendered image of the 3-D volumetric model. Other methods for creating the direction indication may include directly coding of vector information for individual cardinal viewing directions. The 3-D volumetric model may include many thousands/millions of particles having locations within the 3-D volumetric model. Individual particles can be defined by a number of vertices. The vertices may have a 3-D location. In at least one example environment, the vertices may be stored in a vertex buffer and individual of the particles may be defined by a set of four vertices. Other numbers of vertices may be used for defining the particles of a 3-D volumetric model. When the example environment is the universe or a portion of the universe (e.g., WorldWide Telescope by Microsoft®, or another 3-D rendering program), the 3-D volumetric model may include many millions of particles that represent real and scientific data. Individual of the particles has previously assigned rendering attribute(s) that allow individual of the particles to act as an emitter, an occluder, or a transmitter (a form of occluder).

Next, at a block 506, the particles are sorted for individual of the cardinal viewing directions. For example, with regard to the example that uses a vertex buffer, index buffers may be created for individual of the cardinal viewing directions. The sorting computing device or comparable computing device, such as devices 106 and 108, may create the index buffers based on location information for individual of the particles of the 3-D volumetric model and the cardinal viewing directions. At least one index buffer is created for a cardinal viewing direction. Index buffer creation is repeated for the other cardinal viewing directions.

Individual index buffers store particles by the relative location of the particles along the respective cardinal viewing direction. Individual particles are stored in the index buffer by tags referring to the vertex buffer for the vertex associated with the particle. The index buffer provides depth ordering for particles of the 3-D volumetric model (e.g., painter's algorithm).

At a block 508, the sorted particles are saved, based on a vector value associated with a respective cardinal viewing direction. The sorted particles, as identified by the index buffer, may be saved with the vertex buffer at a single location. Alternatively, the index buffers and the vertex buffer may be stored in a distributed manner at multiple locations (e.g., the memory device 130, memory associated with the specialized computing device(s) 108 or computing device(s) 106, or at comparable locations). The vertex buffer may be stored at a first location and the index buffer may be stored at a different second location.

With regard to the real-time rendering process 600, at a block 602, the user's computing device receives the previously saved, sorted particles (e.g., index buffers), their associated cardinal view directions' vector values and vertex buffer of a 3-D volumetric model. The index buffers and vertex buffer may be received from a remotely located computing device 106 and sent to the specialized computing device 108. A user may be operating the specialized computing device 108 in order to interact with a 3-D volumetric model. An example sorting process is shown and described above with regard to FIG. 5. Alternatively, the user's computing device (e.g., specialized computing device 108) may perform the sorting of the particles. In such an example, when the user's computer device is a device comparable to an Intel® Core i5™ processor with HD graphics, sorting of the data of the 3-D volumetric model may be done before real-time navigation rendering can occur.

Figure 8:
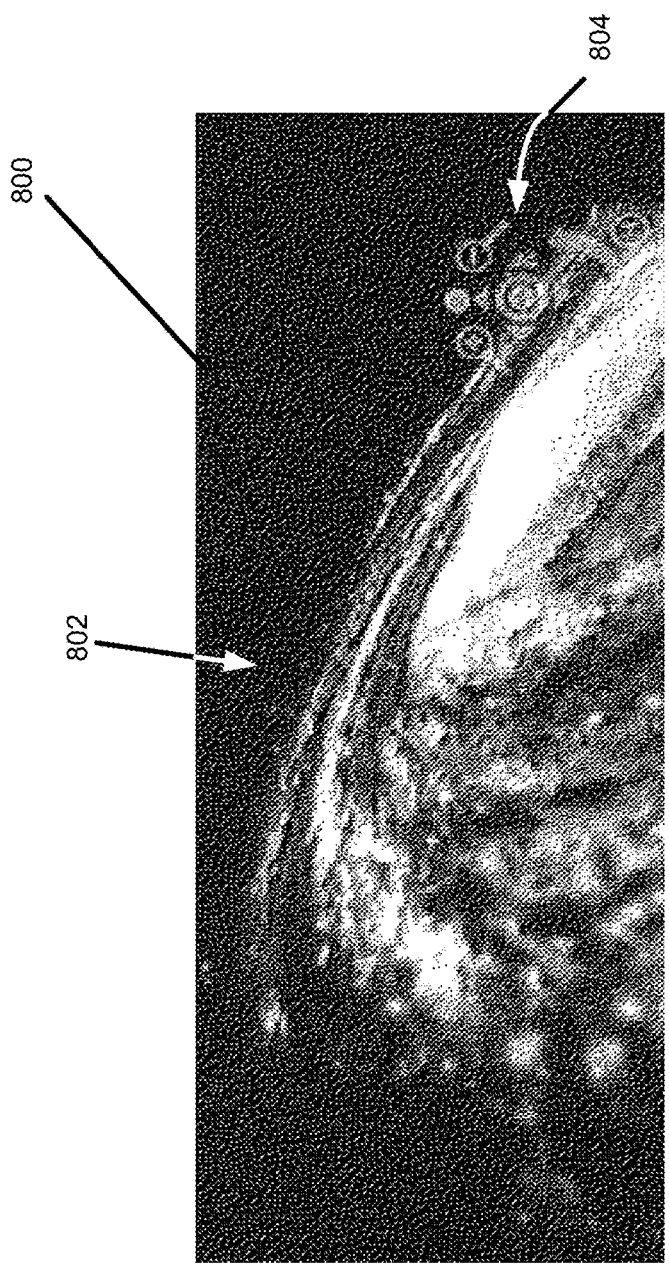
FIGS. 8 and 9 are example screen shots taken of an application program's user interface during user navigation about a 3-D volumetric model of the Milky Way galaxy.
Figure 9:
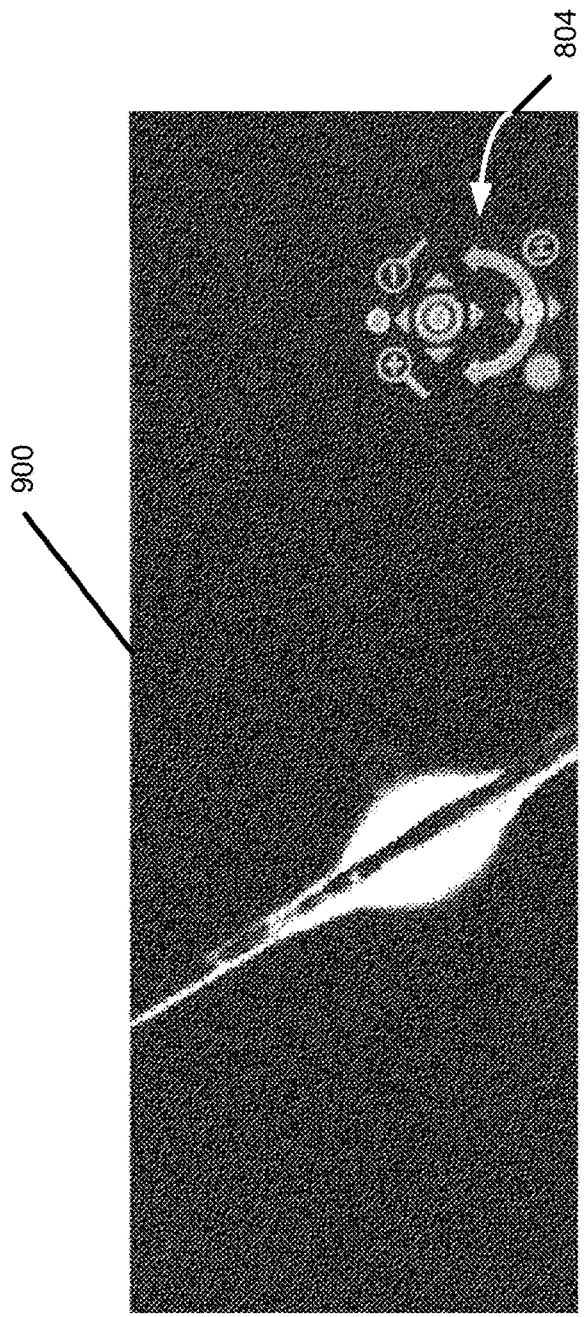

Next, at a block 604, the computer device receives a navigation input produced by the user operating a user interface device, such as navigation control device 134. Navigation control device 134 may be a hardware component, software component or a combination hardware/software component. An example hardware component may be a mouse where up/down mouse motion may control motion in and out of the viewing direction of a 3-D volumetric model. Left/right mouse motion may control a yaw motion relative to the 3-D volumetric model. A scroll ball/bar may control up/down motion relative to the 3-D volumetric model. An example of a software/hardware component, as shown in FIGS. 8 and 9, may include a graphical user interface (GUI) that includes graphical navigation components that when activated produce motion control signals for navigating about a visually rendered 3-D volumetric model. The user operating a cursor control device can activate graphical navigation components associated with the GUI. In at least one example, the GUI is presented on a touch screen device. In the touchscreen example, the user tactilely activates the graphical navigation components of the GUI.

At a block 606, the computing device of the user identifies a user's viewing direction associated with the received navigation input. The identified user's viewing direction can include at least a vector associated with a coordinate system of a 3-D volumetric model. Various types of coordinate systems may be used. As a user navigates through a 3-D volumetric model, a point of view can be identified by a virtual viewpoint and the user's viewing direction vector. The virtual viewpoint can have a positional value within the 3-D volumetric model. The user's viewing direction vector corresponds to a user's line-of-sight starting at the virtual viewpoint.

At a block 608, the computing device identifies the most relevant of the previously identified cardinal viewing directions based on the identified user's viewing direction vector and the vector values associated with those cardinal viewing directions. The computer device, as instructed by the rendering module, compares the identified user viewing direction vector to the vector values associated with the cardinal viewing directions. One example method that can be used to perform this comparison is to take the dot product of a vector associated with the user viewing direction with individual of the cardinal viewing direction vector values. The cardinal viewing direction with the vector value that produces the largest dot product result with the user's viewing direction vector may be considered the most relevant cardinal viewing direction.

Other methods for finding the closest or most relevant cardinal viewing directions may be performed. One possible alternative method may have the cardinal viewing directions being defined using spherical coordinates (2 angles) (Polar coordinate system) instead of a 3 element vector (Euclidean space). A method for finding the closest or most relevant cardinal viewing direction in the Cartesian coordinate system or the Polar coordinate system may include hashing the (normalized) view direction coordinates and saving the hash results in a table lookup. The term "hash" here refers to converting an arbitrary value, typically in a known range, into an index.

For example, with polar coordinates, an angle between 0 and 360 indicates which horizontal viewing direction and another angle from 0 (straight down) to 180 (straight up) indicates for the vertical viewing direction. For example, the horizontal dimension may be split into 4 bins (North, South, East, and West) and the vertical into 3 bins (Up, Horizontal, Down). Then, the first angle divided by 90 defines the horizontal bin, and the second angle divided by 90 defines the vertical bin. Then, the 12 bins (4 horizontal×3 vertical) are filled with the correctly sorted lists. Selection of the list is based on the two angles with two divides. All four Up bins are the same, and all four Down bins are the same, so it's really just 6 sortings.

Likewise with Cartesian coordinates, given a normalized direction (x,y,z) with length (x,y,z)=1, then three simple multiplies will determine which of the arbitrary number of bins you have decided on is correct for that view direction.

In the case of 6 bins, up, down, north, south, east, west, the correct bin can be determined by just looking at the magnitudes and signs of the view direction component. For example, if east is positive X, north is positive Y, and up is positive Z, then if the magnitude of the y component of the view direction is greater than the x and z components, then the view direction must be most closely aligned with north/south. If furthermore the y component is negative, then it is south.

At a block 610, the computing device can render an image frame based on the sorted data associated with the identified most relevant cardinal viewing direction and the virtual viewpoint associated with the navigation input. In at least one example, the image frame includes many pixels and the image frame is defined relative to the virtual viewpoint. Using the virtual viewpoint, the stored particles and rendering attribute(s) of the stored particles, the computing device (e.g., GPU) identifies a value for pixels of the image frame. The result is an image frame that accurately reflects an image that would have been created if particle ordering was performed relative to the user's actual viewing direction vector. If an adequate number of cardinal viewing directions are used relative to the minimum separation of particles in the 3-D volumetric model, then no improper ordering occurs.

After a delay, block 612, as performed by hardware and/or software delay device or due to the processing that has occurred between blocks 602 through 610, the computing device receives a next navigation input and determines whether the next navigation input received is different from the last received navigation input, see decision block 614. If the next navigation input is not different from the last, at block 616, the previously rendered image frame may be repeated. Then, the process 600 may return to the delay 612 to further determine if a next navigation input is different from the last. In some examples, if the next navigation input received is a different (new) navigation input, the process 600 returns to block 606 to repeat for the next different navigation input. Alternatively, the decision at block 614 may not be performed and the process returns to block 604 for automatically taking the next user entered navigation input regardless of whether the new navigation input is new or not.

The rendered frames can be presented at an output device, such as a display device 132. Because of the computational savings due to presorting along cardinal viewing directions, the processor is able to render the generated frames in real time (e.g., at a predefined frame rate) from when the navigation input was entered by the user. The result is a real-time video presentation that tracks while the user navigates about the 3-D volumetric model. The real-time video presentation can appear seamless as one image frame transitions from identifying a first most relevant Cardinal viewing direction and using the presorted particles associated with the first most relevant Cardinal viewing direction to a second most relevant Cardinal viewing direction and using the presorted particles associated with the second most relevant Cardinal viewing direction. When more cardinal view directions and associated presorted particles are used, the transitions will appear more seamless.

In at least one example, the 3-D volumetric model with associated vertex buffer and stored particles identified in a plurality of index buffers, as may be produced by volumetric modeling framework 114 and/or specialized computing device-side volumetric modeling framework 124, are stored and operated on in a cloud computing environment. In this example, the specialized computing device(s) 108 generates 3-D volumetric model user interaction signals based on user manipulation of hardware and/or software components associated with display device 132, navigation controller 134 and/or I/O interface(s) 126. The 3-D volumetric model user interaction signals are sent via network(s) 104 to a cloud computing device(s) (e.g., distributed computing resources 102). Cloud computing device(s) performs process 600 based on the 3-D volumetric model user interaction signals.

In some examples, processes 500 and 600 are implemented with 3-D volumetric models may be produced with medical imaging data generated from any of a number of medical imaging sources (e.g., MRI, CAT, etc.). Medical imaging data may include anatomical information represented by vertices that include rendering attributes that when rendered may exhibit occlusive and/or emissive properties. The medical imaging data may include many thousands of pieces of anatomical information represented by many more thousands of vertices that are stored in a vertex buffer. Index buffers may be created for individual of a plurality of cardinal viewing directions. The index buffers reference the vertices in the vertex buffer that are sorted based on position relative to the associated one of the plurality of cardinal viewing directions.

After the sorted index buffers are created, a graphics processor can render frames in real-time as a user (e.g., doctor, radiologist, etc.) inputs navigation commands using a navigation control device. The graphics processor compares user view direction associated with the user input navigation commands entered using the navigation control device to vectors associated with individual of the plurality of cardinal viewing directions. The index buffer associated with the cardinal viewing direction having the closest vector to a vector associated with the user view direction may be used by the graphics processor to render an image frame. The comparison and image frame rendering may be repeated at a predefined interval. The result is a series of image frames that in real-time from when a user inputs navigation commands.

In other examples, processes 500 and 600 are implemented with 3-D volumetric models may be produced with geological imaging data generated from any of a number of geological imaging sources (e.g., shock waves, etc.). Geological imaging data may include information represented by vertices that include attributes that when rendered may exhibit occlusive, emissive and/or transmissive properties. The geological imaging data may include many thousands of separately definable geologic information represented by many more thousands of vertices that are stored in a vertex buffer. Index buffers may be created for individual of a plurality of cardinal viewing directions. The index buffers reference the vertices in the vertex buffer that are sorted based on position relative to the associated one of the plurality of cardinal viewing directions.

After the sorted index buffers are created, a graphics processor can render frames in real-time as a user (e.g., geologist, etc.) inputs navigation commands a navigation control device. The graphics processor compares user view direction associated with the user input navigation commands entered using the navigation control device to vectors associated with individual of the plurality of cardinal viewing directions. The index buffer associated with the cardinal viewing direction having the closest vector to a vector associated with the user view direction may be used by the graphics processor to render an image frame. The comparison and image frame rendering may be repeated at a predefined interval. The result is a series of image frames that in real-time from when a user inputs navigation commands.

Figure 7:
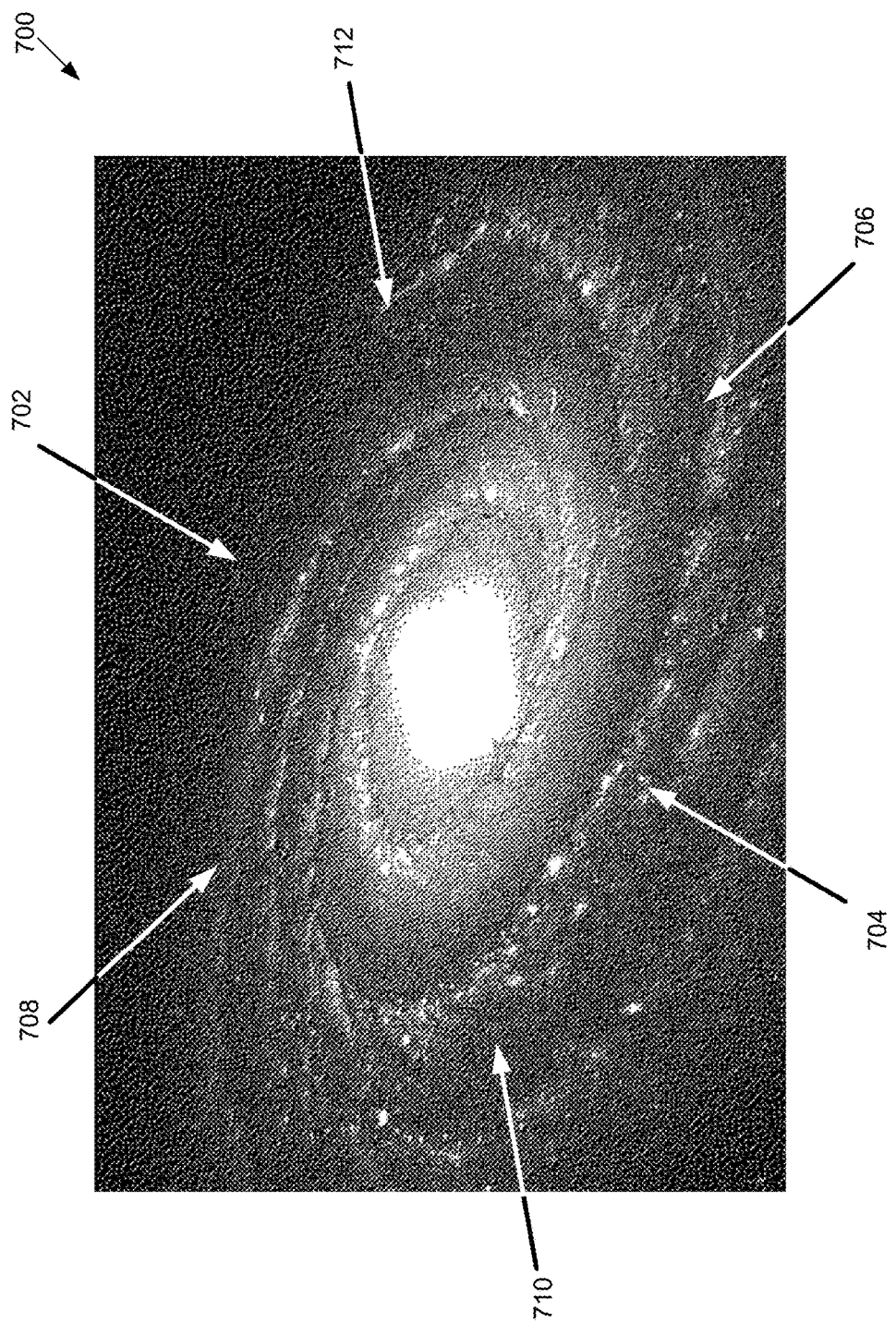
FIG. 7 is a perspective view of an example 3-D volumetric model of a galaxy with cardinal viewing directions depicted.

FIG. 7 is an image of an example 3-D volumetric model of the Milky Way galaxy 700. Example preselected cardinal viewing directions 702, 704, 706, 708, 710, and 712 are shown relative to the galaxy model 700. The galaxy model 700 has a major plane where most of the interstellar objects reside. The major plane can include the arms of the Milky Way that span approximately 120,000 actual light-years in width. Cardinal viewing directions 702 and 704 may be roughly perpendicular to the major plane and cardinal viewing directions 706 through 712 may be roughly parallel to the major plane, while cardinal viewing directions 706 and 708 may be roughly perpendicular to cardinal viewing directions 710 and 712. For individual cardinal viewing directions 702 through 712, the particles are sorted prior to when the frame rendering occurs. The sorted data may be stored in index buffers that point to vertex data stored in a vertex buffer. The vertex data describes the particles of the 3-D volumetric model. If the viewing directions have exact or near exact opposites (e.g., (702, 704), (706, 708), (710, 712)), once an index buffer has been created for one of the cardinal viewing directions, the system may apply an optimization algorithm in order to invert the image buffer to generate the index buffer of the exact or near-exact opposite viewing direction. As used herein, near exact opposite Cardinal viewing directions may be within a threshold angular value of each other.

A different number of cardinal viewing directions relative to the galaxy model 700 may be chosen. When the user-commanded viewing direction requires a transition between different cardinal viewing directions, the navigation rendering may produce more visual anomalies than when a greater number of cardinal viewing directions are used.

FIGS. 8 and 9 are example rendered frames 800 and 900 presented on a user display device as the user navigates in and around a rendering of 3-D volumetric model 802 of the Milky Way galaxy. The user may control navigation by manipulating an on-screen navigation control device 804 using a cursor control, such as a mouse. The on-screen navigation control device 804 allows the user to navigate three-dimensionally about the 3-D volumetric model. The Milky Way galaxy 3-D volumetric model includes dust layer/dust cloud particles that are examples of occlusive particles, stars that are examples of emissive particles, and many other particles having various properties. The on-screen navigation control device 804 may be activated directly by a user when displayed on a touch screen display device or indirectly using an indirect control device such as a touch pad, mouse, gestures, etc. In response to the user activating the on-screen navigation control device 804, the user may be allowed to navigate in multiple degrees of motion (e.g., pitch, roll, yaw, forward, backward, etc.) relative to the rendered 3-D volumetric model.

FIG. 9 shows the example frame 900 that is rendered from a requested viewing direction along the major plane of the galaxy model. From this viewing direction many dust layer particles occlude stars and other emissive particles in a major portion of a middle layer of the galaxy.

Described above are methods for performing real-time rendering of a static 3-D volumetric model. The 3-D volumetric model may include real data, such as medical imaging data, geological data or astronomical data (as shown by example above) or virtual/manufactured data, such as theoretical data or created worlds used for fantasy or other types of games. In various examples, the above described technique may be used in a gaming or comparable application. In such examples, portions of the 3-D volumetric model or other objects interacting with the static 3-D volumetric model may not be static. In such a situation, the active object may be separated from the static particles during draw call. For example, the active object has a known position and direction of motion. First, the best sort direction is determined as previously described. Then the drawing of the particles is split into two batches, one with those particles behind the moving object and the second with the particles in front of the moving object. Since the particles are already sorted along the viewing direction this becomes an efficient binary search which can be done each frame. Alternatively, if the motion of the moving object is relatively slow relative to the volume of the particles coherence between frames can be utilized. Once the initial split is found, then the split point (sort order) will change little if at all from frame to frame making the proper rendering even less expensive. The above process applies when the moving object is either emissive or translucent. Fully opaque active objects may be drawn in advance of the emissive and translucent data.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully automated via, software code modules executed by one or more general-purpose computers or processors. The code modules may be stored in any type of computer-readable storage medium or other computer storage device. Some or all of the methods may alternatively be embodied in specialized computer hardware.

Conditional language such as, among others, "can", "could", or "may", unless specifically stated otherwise, are understood within the context to present that certain examples include, while other examples do not include, certain features, elements, and/or steps. Thus, such conditional language is not generally intended to imply that certain features, elements, and/or steps are in any way required for one or more examples or that one or more examples necessarily include logic for deciding, with or without user input or prompting, whether certain features, elements, and/or steps are included or are to be performed in any particular example.

Conjunctive language such as the phrase "at least one of X, Y, or Z," unless specifically stated otherwise, is to be understood to present an item, term, etc. that may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein, in which elements or functions may be deleted, or executed out of order from that shown or discussed, including substantially synchronously or in reverse order, depending on the functionality involved, as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   obtaining previously sorted data of a 3-D volumetric model comprising a plurality of particles, the plurality of particles having at least one of an emissive rendering attribute or an at least partially occlusive rendering attribute, the previously sorted data including a plurality of index buffers, each index buffer corresponding to a respectively different viewing direction and including the plurality of particles stored at relative locations in the index buffer that are consistent with the respectively different viewing direction;
   receiving a user-commanded viewing direction from a control device;
   determining, based on the user-commanded viewing direction, a most relevant index buffer of the plurality of index buffers of the previously sorted data of the 3-D volumetric model comprising the plurality of particles; and
   rendering an image frame based at least on a viewpoint associated with the user-commanded viewing direction, the most relevant index buffer, and at least one of the rendering attributes associated with individual particles of the plurality of particles.

2. The method as recited in claim 1, further comprising:
   receiving a new user-commanded viewing direction; and
   repeating the determining and the rendering based at least on the new user-commanded viewing direction.

3. The method as recited in claim 2, further comprising:
   outputting the rendered image frames on a display device at a predefined video frame rate in real time from receiving the user-commanded viewing direction.

4. The method as recited in claim 1, wherein the obtaining comprises:
   selecting a plurality of viewing directions; and
   sorting the plurality of particles of the 3-D volumetric model for an individual viewing direction of the selected plurality of viewing directions.

5. The method as recited in claim 4, wherein:
   the 3-D volumetric model comprises a plurality of vertices that define individual particles of the plurality of particles, the plurality of vertices are stored in a vertex buffer,
   the sorting comprises saving the sorted plurality of particles in the plurality of index buffers including one index buffer associated with the individual viewing direction of the selected plurality of viewing directions, and
   the storing is performed before the selecting and the sorting.

6. The method as recited in claim 5, wherein the index buffers comprise references to the vertices stored in the vertex buffer.

7. A device comprising:
   a memory device configured to store a vertex buffer and a plurality of index buffers, the vertex buffer storing a plurality of vertices that define individual particles of a static 3-D volumetric model and the index buffers storing previously sorted particle data representing the particles of the 3-D volumetric model based at least on respective previously defined view directions, the previously sorted particle data stored at relative locations in each index buffer that are consistent with a respective view direction of the previously defined view directions, wherein the particles comprise one of an emissive attribute or an at least partially occlusive attribute;
   a processing device in communication with the memory device and a control device, the processing device configured to:
   determine a most relevant view direction of the previously defined view directions based at least on a user-commanded viewing direction; and
   render an image frame based at least on a viewpoint associated with the user-commanded viewing direction and the stored sorted index buffer data associated with the determined most relevant previously defined view direction.

8. The device as recited in claim 7, further comprising a control device configured to produce a user-commanded viewing direction, wherein the processing device is further configured to receive the user-commanded viewing direction.

9. The device as recited in claim 7, wherein the processing device is further configured to:
   receive a new user-commanded viewing direction; and
   repeat the determining and the rendering based at least on the new user-commanded viewing direction.

10. The device as recited in claim 9, further comprising:
    a display device configured to output the rendered image frames at one of a dynamic or a predefined video frame rate in real time responsive to receiving the user-commanded viewing direction.

11. The device as recited in claim 7, wherein the processing device is further configured to:
    receive a selection of a plurality of viewing directions; and
    sort the particles of the 3-D volumetric model for an individual viewing direction of the plurality of viewing directions.

12. The device as recited in claim 11, wherein the reception of the selection and the sort are performed prior to the storing the previously sorted particle data of the 3-D volumetric model in the respective index buffer.

13. The device as recited in claim 12, wherein the index buffers comprise references to the vertices stored in the vertex buffer for the respective particles.

14. One or more computer storage media storing computer-executable instructions that, when executed on one or more processors, configure a computer to perform acts comprising:
    obtaining, a vertex buffer and a plurality of index buffers, the vertex buffer storing a plurality of vertices that define individual of particles of a static 3-D volumetric model and index buffers storing previously sorted particle data representing the particles of the 3-D volumetric model based at least on respective previously defined view directions, the previously sorted particle data stored at relative locations in each index buffer that are consistent with a respective view direction of the previously defined view directions, wherein the particles comprise one of an emissive attribute or an at least partially occlusive attribute;
    receiving a user-commanded viewing direction from a control device;

determining a most relevant view direction of the previous' defined view directions based at least on the user-commanded viewing direction; and rendering an image frame based at least on a viewpoint associated with the received user-commanded viewing direction and the stored sorted index buffer data associated with the determined most relevant previously defined view direction.

15. The one or more computer storage media as recited in claim 14, the acts further comprising:

receiving a new user-commanded viewing direction; and repeating the determining and the rendering based at least on the new user-commanded viewing direction.

16. The one or more computer storage media as recited in claim 14, the acts further comprising:

outputting the rendered image frames at a predefined video frame rate in real time from receiving the user-commanded viewing direction.

17. The one or more computer storage media as recited in claim 14, the acts further comprising:

prior to the receiving, the determining, and the rendering, selecting a plurality of viewing directions; and sorting the particles of the 3-D volumetric model for individual viewing directions of the plurality of viewing directions into respective ones of the index buffers.

18. The one or more computer storage media as recited in claim 17, the acts further comprising:

storing a plurality of vertices that define the respective particles in a vertex buffer; and saving the data representing the sorted particles in the index buffers associated respectively with the selected plurality of viewing directions, wherein the storing is performed before the obtaining.

* * * * *